United States Patent
Tseng et al.

(10) Patent No.: US 8,120,330 B1
(45) Date of Patent: Feb. 21, 2012

(54) AMPLITUDE LOCK LOOP FOR PRODUCING CONSTANT AMPLITUDE OSCILLATOR RAMP SIGNAL

(75) Inventors: Jaime Tseng, Saratoga, CA (US); Peter Jie Guan, Fremont, CA (US); Li Ma, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 841 days.

(21) Appl. No.: 12/202,736

(22) Filed: Sep. 2, 2008

Related U.S. Application Data

(60) Provisional application No. 60/935,803, filed on Aug. 31, 2007.

(51) Int. Cl.
*H01M 10/46* (2006.01)
(52) U.S. Cl. ........................................... 320/166
(58) Field of Classification Search .................. 320/107, 320/137, 166, 167, 141
See application file for complete search history.

(56) References Cited

U.S. PATENT DOCUMENTS

| | | | |
|---|---|---|---|
| 6,369,665 B1 | 4/2002 | Chee et al. | |
| 6,636,021 B2 * | 10/2003 | Schenkel et al. | 320/166 |
| 7,573,250 B2 * | 8/2009 | Clavette | 323/288 |
| 2003/0090240 A1 * | 5/2003 | Schenkel et al. | 320/166 |
| 2006/0043956 A1 * | 3/2006 | Clavette | 323/288 |

OTHER PUBLICATIONS

Applicant's Admission of Prior Art (Figures 1 and 2 in U.S. Appl. No. 12/202,736, filed Sep. 2, 2008).

* cited by examiner

*Primary Examiner* — Edward Tso
(74) *Attorney, Agent, or Firm* — McDermott Will & Emery LLP

(57) ABSTRACT

An oscillator that includes an energy storage system configured to store energy, a ramp circuit configured to generate an oscillating ramp signal having a slope that is a function of the amount of energy stored in the energy storage system, a charge circuit configured to controllably deliver energy into or remove energy from the energy storage system, a comparator circuit configured to compare the oscillating ramp signal with a reference signal; and/or a charge control circuit configured to cause the charge circuit to deliver energy into or remove energy from the energy storage system based on the comparison by the comparator circuit.

21 Claims, 5 Drawing Sheets

AMPLITUDE LOCK LOOP FOR PRODUCING CONSTANT AMPLITUDE OSCILLATOR RAMP SIGNAL

CROSS-REFERENCE TO RELATED APPLICATION

This application claims the benefit of and priority to U.S. Provisional Application Ser. No. 60/935,803, filed Aug. 31, 2007, entitled "Amplitude Lock Loop for Producing Constant Amplitude Oscillator Ramp Signal." The entire content of this provisional application is incorporated herein by reference.

BACKGROUND

1. Technical Field

This disclosure relates to circuits for producing oscillating ramp signals and for producing slope compensation signals in switching regulators.

2. Description of Related Art

Voltage regulators often provide a constant output voltage, regardless of fluctuations in the load or supply voltage.

One type of voltage regulator is a linear voltage regulator. The output voltage is regulated by changing the impedance of a pass element through which current flows from the voltage source to the load. Linear regulators, however, can waste energy and generate substantial heat.

Another type of voltage regulator is a switching voltage regulator. The flow of current from the voltage source to the load is not steady. Instead, it flows in discrete pulses which are usually converted into steady load current by an inductive storage element. By controlling the width of the pulses, the voltage to the load can be regulated.

The width of each pulse may be controlled by an electronic switch, such as a power transistor. The switch may be coupled either in series or in parallel with the load. By controlling the duty cycle of this switch—i.e., the percentage of time that the switch is ON relative to the total period of the switching cycle—a switching voltage regulator can regulate the voltage on the load.

A switching voltage regulator may operate in the current mode, meaning that it may be controlled by a signal indicative of a current in the regulator. However, there may be instability in a current-mode switching voltage regulator when the switching duty cycle exceeds 50%, that is, when the switch is ON for more than 50% of a given switching period. Stability may often still be maintained at such high duty cycles by adjusting the current signal that is used to control the regulator with a slope compensation signal which compensates for the instability.

A portion of an oscillator signal, such as a ramp signal, may often be used as a slope compensation signal. In some applications, however, such as in certain communications circuitry which must operate at high frequencies, the switching voltage regulator must be switched in synchronism with an external clock. In these circuits, instability may still result unless the slope compensation signal is also synchronized to the external clock.

This synchronization may be achieved with a phase locked loop circuit. However, these circuits can be complex, may need large compensation network components, and may take too much time to capture and become synchronized.

Another approach is to add circuitry to detect the presence of the external clock. Once the external clock is detected, the slope compensation may be increased by a fixed factor to account for the maximum synchronizable frequency. One problem with this approach, however, may be overcompensation if the regulator is synchronized just slightly above the normal operating frequency. This may cause the maximum output current to be reduced by the amount of the overcompensation.

Another approach is described in U.S. Pat. No. 6,369,665 to Chee et al., assigned to the assignee of the current invention, and incorporated herein by reference. Chee et al. use a set of digitally controlled current sources, driven by an up-down counter, to provide the needed adjustment. However, this approach can be complex and require a substantial area within a chip on which the circuit is integrated.

SUMMARY

An oscillator may include an energy storage system configured to store energy, a ramp circuit configured to generate an oscillating ramp signal having a slope that is a function of the amount of energy stored in the energy storage system, a charge circuit configured to controllably deliver energy into or remove energy from the energy storage system, a comparator circuit configured to compare the oscillating ramp signal with a reference signal; and/or a charge control circuit configured to cause the charge circuit to deliver energy into or remove energy from the energy storage system based on the comparison by the comparator circuit.

The oscillator may include means for performing each of these functions, other than or in addition to the components that were just described.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
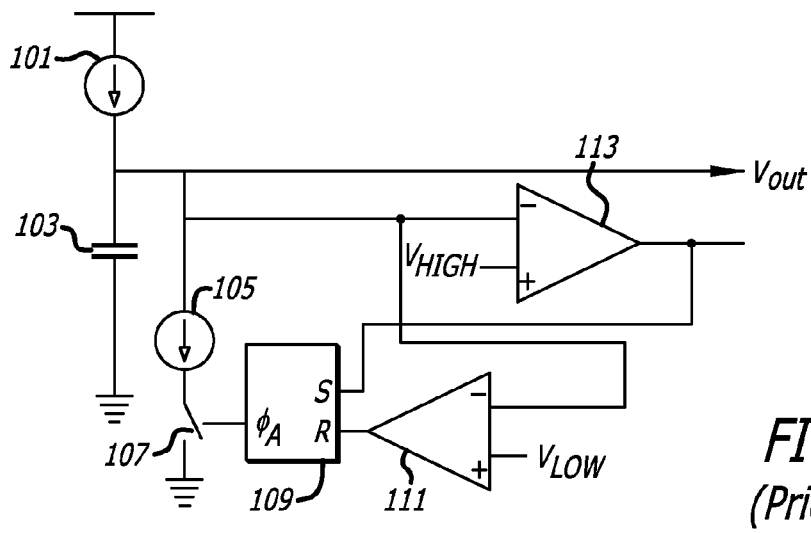
FIG. 1 is a prior art circuit for producing a free-wheeling oscillator ramp signal.
Figure 2:
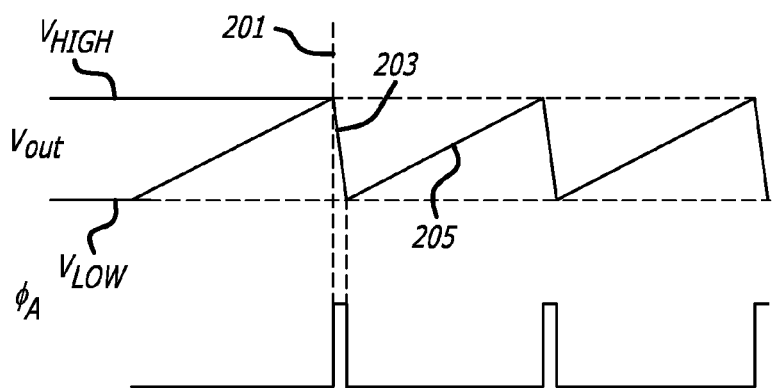
FIG. 2 is a diagram of selected signals in FIG. 1.

FIG. 1 is a prior art circuit for producing a free-wheeling oscillator ramp signal. FIG. 2 is a diagram of selected signals in FIG. 1.

As illustrated in FIG. 1, a constant current source 101 may be configured to charge a capacitor 103. A constant current source 105 may be configured to controllably discharge the capacitor 103 upon closure of an electronic switch 107.

A comparator 113 may be configured to compare the voltage $V_{OUT}$ on the capacitor 103 to a peak reference voltage $V_{HIGH}$. When $V_{OUT}$ reaches $V_{HIGH}$ at a time 201, the output of the comparator 113 may go low, setting a latch 109. An output $\Phi_A$ of the latch 109 may then go high, thereby closing the electronic switch 107. The closure of the electronic switch 107 may cause the current source 105 to draw current away from the node of the constant current source 101 and the capacitor 103. In a typical configuration, the constant current source 105 may draw substantially more current than what is delivered by the constant current source 101. Thus, the capacitor 103 may discharge at this time, as illustrated by a falling edge 203 in $V_{OUT}$ of FIG. 2.

Once $V_{OUT}$ reaches a low reference voltage $V_{LOW}$, the output of a comparator 111 may go high, resetting the latch 109 and thus opening the electronic switch 107. The capacitor 103 may again charge, as illustrated by a rising edge 205. This process may repeat periodically.

The net effect of this circuit may be to produce the oscillating ramp signal $V_{OUT}$ illustrated in FIG. 2. $V_{OUT}$ may begin at $V_{LOW}$ and peak at $V_{HIGH}$.

As should now be apparent, however, $V_{OUT}$ is a free-running oscillating ramp which may not be synchronous with an external clock and thus not be suitable for certain applications, as discussed in the Description of Related Art above.

Figure 3:
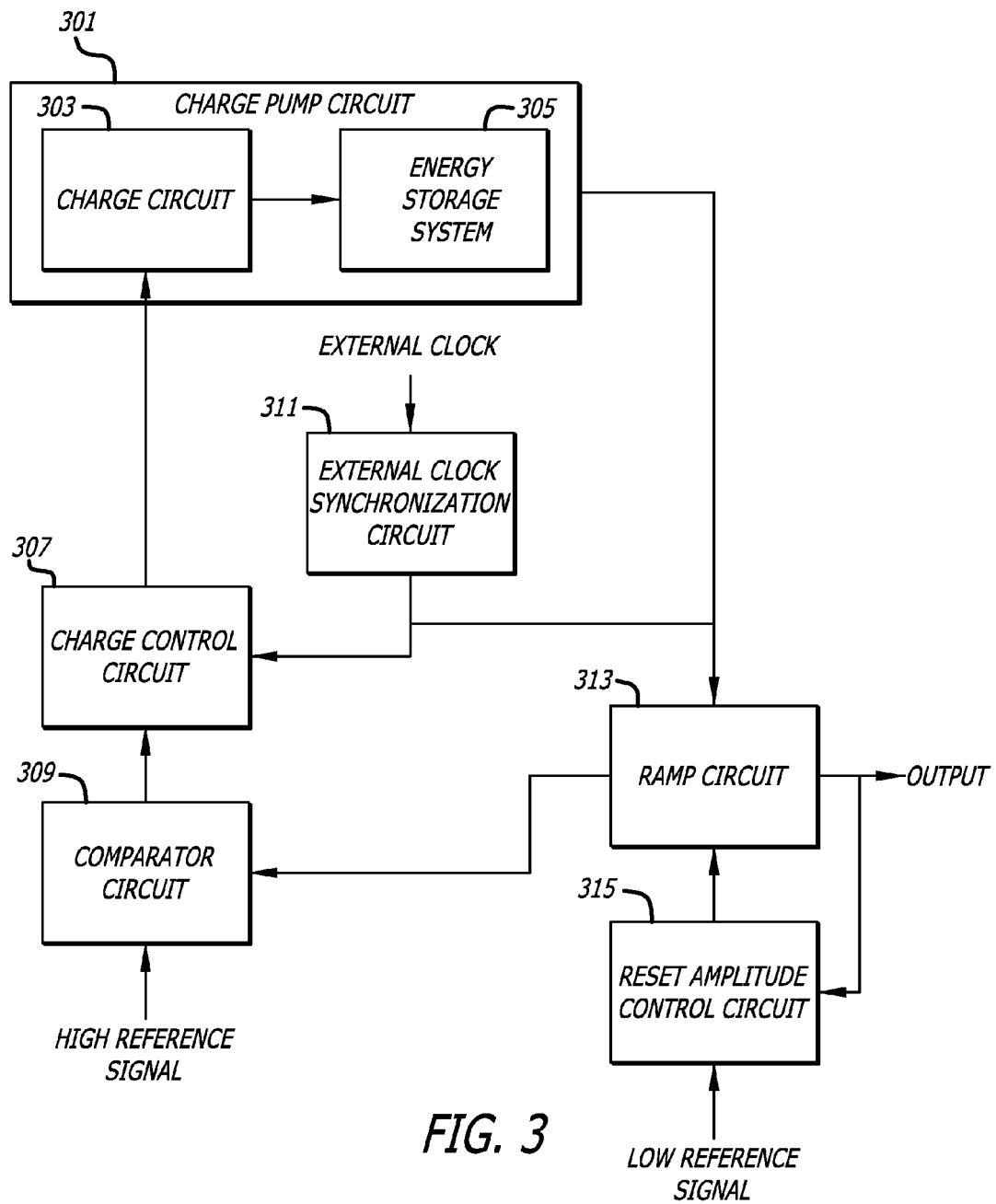
FIG. 3 is a block diagram of an amplitude lock loop for producing a constant amplitude oscillator ramp signal.
Figure 4:
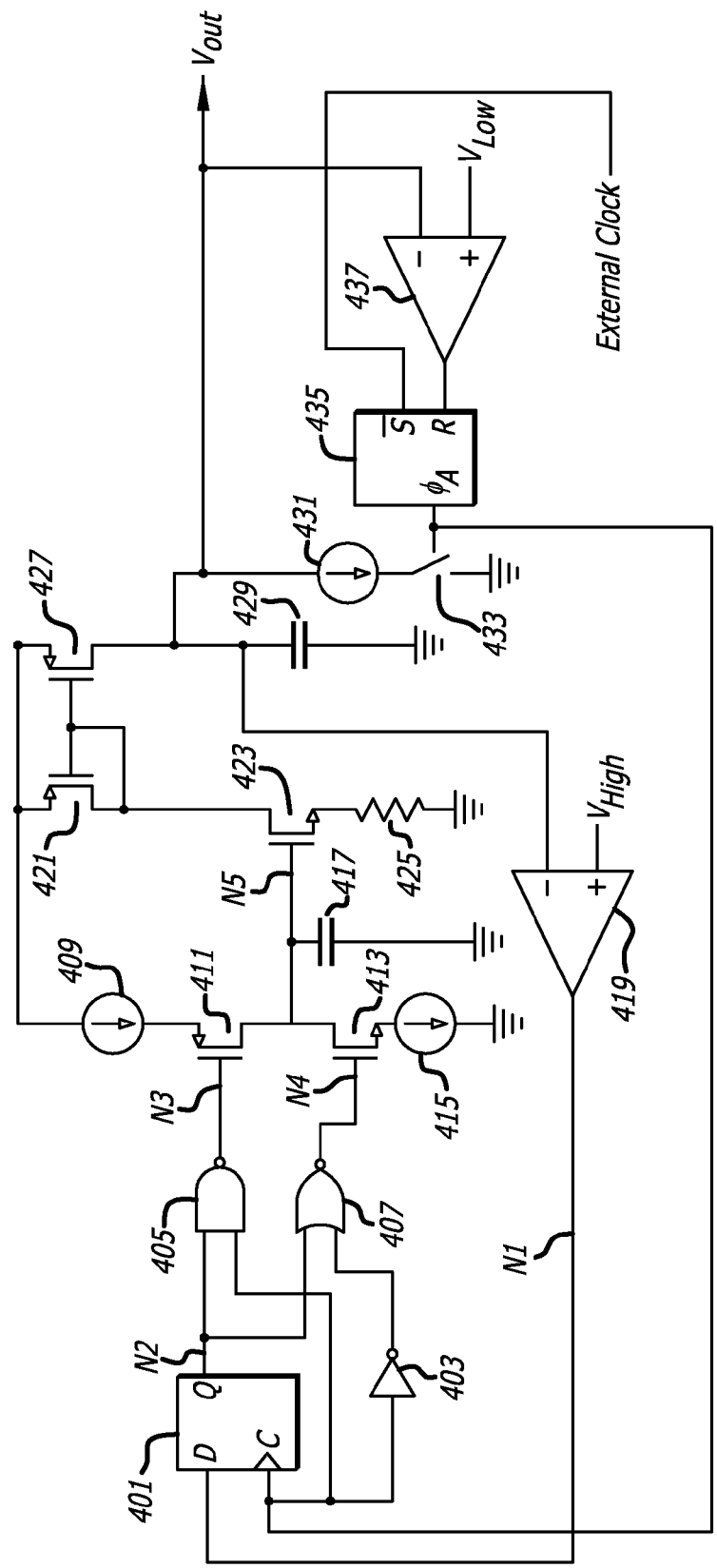
FIG. 4 is a circuit diagram of an amplitude lock loop for producing a constant amplitude oscillator ramp signal.

FIG. 3 is a block diagram of an amplitude lock loop for producing a constant amplitude oscillator ramp signal. FIG. 4 is a circuit diagram of an amplitude lock loop for producing a constant amplitude oscillator ramp signal. The circuit in FIG. 4 may implement the block diagram in FIG. 3. However, many different types of circuits may implement this block diagram as well.

As illustrated in FIG. 3, the amplitude lock loop may include a ramp circuit 313. The ramp circuit 313 may be configured to produce an oscillating ramp signal at its output. The ramp circuit 313 may also be configured to control the slope of the ramp based on an input. The ramp circuit 313 may also be configured to control when each ramp begins and ends, also based on inputs.

The ramp circuit 313 is illustrated in FIG. 4 as being implemented by p-channel MOSFETS 421 and 427, a resistor 425, an n-channel MOSFET 423, a capacitor 429, a constant current source 431, and an electronic switch 433.

The p-channel MOSFET 427 may function as a controllable, constant current source, delivering current into the capacitor 429. This may cause the capacitor 429 to charge, creating the ramp of the oscillating ramp signal. The amount of current delivered by the p-channel MOSFET 427 may be a function of the voltage delivered to the gate of the n-channel MOSFET 423. Collectively, the p-channel MOSFETS 421 and 427, the resistor 425, and the n-channel MOSFET 423 may form a voltage-to-current converter which causes the amount of current that is pumped into the capacitor 429 to be a function of the voltage on the gate of the n-channel MOSFET 423. That function may be a substantially linear function.

When the voltage on the capacitor 429 reaches a desired level, the electronic switch 433 may be actuated, causing current to be removed from the node of the capacitor 429 and the p-channel MOSFET 427 by the constant current source 431. The constant current source 431 may take far more current than can be delivered by the p-channel MOSFET 427, thus causing the capacitor 429 to discharge. The peak amplitude of the ramp signal on the capacitor 429, which is also when the ramp begins to reset, may be controlled by the closure of the electronic switch 433. Similarly, the amplitude at which the ramp is initiated and thus the end of the reset phase may be controlled by the opening of the electronic switch 433.

The amplitude lock loop may include an energy storage system 305. The energy storage system 305 may include one or more components that are configured to store energy, such as one or more capacitors and/or inductors. In FIG. 4, the energy storage system 305 consists of a single capacitor 417.

The amplitude lock loop may include a charge circuit 303. The charge circuit 303 may be configured to controllably deliver energy into or remove energy from the energy storage system 305. Any type of circuit may be used for this purpose. In FIG. 4, the charge circuit 303 is implemented with a constant current source 409, a p-channel MOSFET 411, an n-channel MOSFET 413 and a constant current source 415. These components may be configured so as to cause charge to be delivered to the capacitor 417 when the p-channel MOSFET 411 is activated, and to remove charge from the capacitor 417 when the n-channel MOSFET 413 is activated.

The charge circuit 303 and the energy storage system 305 may be part of a charge pump circuit 301. The corresponding components in FIG. 4 that have been discussed above may similarly be part of a charge pump circuit. Other configurations for the charge circuit 303 and the energy storage system 305 may be used instead.

A comparator circuit 309 may be configured to compare the oscillating ramp signal generated by the ramp circuit 313 with a reference signal, such as a high reference signal. In FIG. 4, a comparator 419 is configured to perform this function and the high reference signal is indicated as $V_{HIGH}$.

A charge control circuit 307 may be configured to cause the charge circuit 303 to deliver energy into or remove energy from the energy storage system 305 based on the comparison by the comparator circuit 309. In FIG. 4, the charge control circuit 307 is implemented by a D-memory 401, an inverter 403, a NAND gate 405, and a NOR gate 407. As will become more apparent in connection with the discussion below of FIGS. 5 and 6, the charge control circuit 307 may be configured in FIG. 4 to either add charge to or remove charge from the capacitor 417 during each periodic reset phase of the oscillating ramp signal.

An external clock synchronization circuit 311 may be configured to substantially synchronize the oscillating ramp signal with an external clock. In FIG. 4, the external clock synchronization circuit 311 is implemented by a latch 435. The effect of the latch 435 on synchronization will become apparent during the discussion below of FIGS. 5 and 6.

A reset amplitude control circuit 315 may be configured to terminate each periodic reset phase of the oscillating ramp signal and to initiate each periodic ramp each time the oscillating ramp signal substantially reaches the level of a second reference signal indicated in FIG. 3 as a low reference signal. In FIG. 4, the reset amplitude control circuit 315 is implemented by a comparator 437 which may operate in conjunction with the latch 435 and the electronic switch 433. In FIG. 4, the low reference signal is indicated as $V_{LOW}$.

Figure 5:
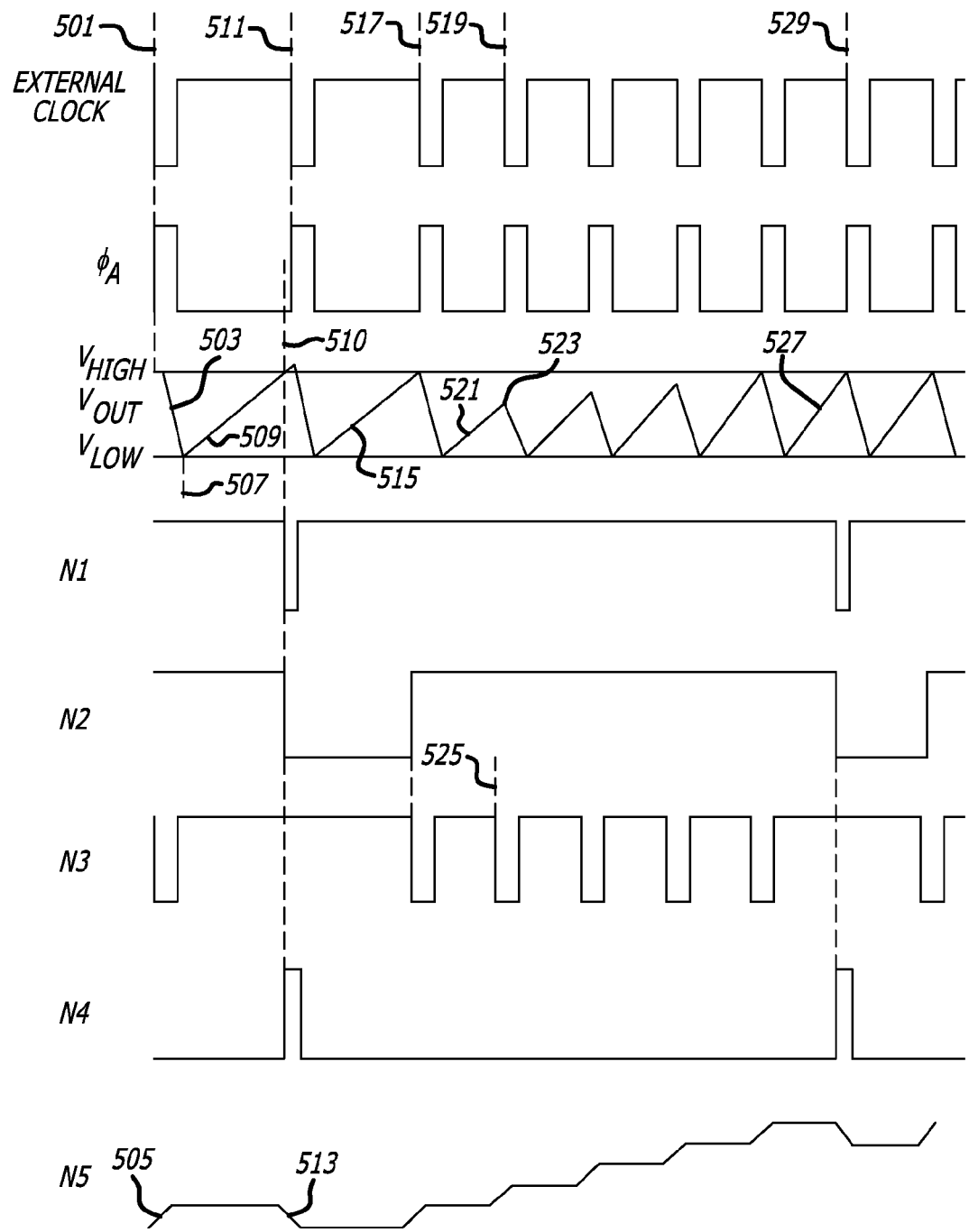
FIG. 5 is a diagram of selected signals in FIG. 4 shown before and after the frequency of an external clock increases.

FIG. 5 is a diagram of selected signals in FIG. 4 shown before and after the frequency of an external clock increases. As shown in FIG. 5, an external clock may fall at a time 501. This may set the latch 435, causing $\Phi_A$ to rise as also shown in FIG. 5. This may activate the electronic switch 433, causing the capacitor 429 to discharge, as illustrated by a reset phase 503 of $V_{OUT}$.

At the point in time 501, $V_{OUT}$ may be below VHIGH, causing the output of the comparator at a node N1 to be high. The high value of N1 coupled with the clocking of the D-memory 401 by the rising edge of ΦA may cause the output of the D-memory 401 at a node N2 to go high or to maintain a previous high state. The combination of the high output at the node N2 and the on state of ΦA may ultimately cause the gate of the p-channel MOSFET 411 to go low at a node N3, thus causing the voltage at a node N5 across the capacitor 417 to increase, as illustrated by a rising edge 505 at the node N5.

VOUT may ultimately reach VLOW, such as at a time 507. This may cause a change in the output of the comparator 437, the latch 435 to in turn reset, and ΦA in turn to go low. The low OA may cause the electronic switch 433 to open. It may also cause the gate of the p-channel MOSFET 411 at the node N3 to go high, opening the p-channel MOSFET 411 and preventing any further changes to the voltage on the capacitor 417.

Following the time 507, $V_{OUT}$ may ramp up, as charge in the capacitor 429 again builds. The slope of this ramp may be controlled by the magnitude of the voltage on the capacitor 417 by virtue of the voltage-to-current conversion that results from the circuit that consists of the p-channel MOSFET 421, the n-channel MOSFET 423, the resistor 425, and the p-channel MOSFET 427. This time, however, the slope of the ramp 509 may be steeper than the slope of the previous charging cycle because the voltage on the capacitor 417 is now at a higher level.

VOUT may ultimately reach VHIGH, such as at a time 510. This may occur before the next falling edge of the external clock at a time 511. At such time 510, the output of the comparator 419 may go low at the node N1. During the next falling edge of the external clock at the time 511, a low value may therefore instead be clocked into the D-memory 401, causing the gate of the n-channel MOSFET 413 to go high at a node N4, thus causing the voltage across the capacitor 417 to decrease, as reflected by a decreasing edge 513 at the node N5. After the next reset phase is complete, therefore, the slope of the next ramp 515 may be less than the slope of the previous ramp 509, thus causing the ramp not to reach VHIGH prior to the next time 517 when the external clock again goes low.

The capacitor 417 may alternatively be charged and discharged following the processes which have just been described during each alternating cycle of the external clock while the frequency of the external clock remains constant. The net effect may be to generate an oscillating ramp signal that varies approximately between VLOW and VHIGH. Although the ramp may slightly exceed and slightly miss VHIGH on alternating cycles, these differences may be very slight.

The external clock may fall sooner the next time, such as at a time 519, thus resulting in an ON time which is less than its previous ON time. In other words, the frequency of the external clock may decrease. However, the slope of a rising edge 521 of VOUT may not have been steep enough to have caused VOUT to reach VHIGH by the time 519. As a consequence, a peak 523 of VOUT may be significantly below VHIGH. Such a deficiency may then cause additional energy to be pumped into the capacitor 417, as evidenced by a falling edge at a time 525 at the node N3. Pulses of charge may continue to be delivered into the capacitor 417 during each succeeding OFF time of the external clock until the slope of the rising edge of VOUT becomes sufficiently steep to cause VOUT to exceed VHIGH before a falling edge of the external clock, as reflected by a slope 527 at a time 529. Once this happens, the voltage across the capacitor 417 may again alternate above and below the level necessary for causing the slope of VOUT to be of the amount necessary for causing the peak value of VOUT to approximately equal VHIGH.

Figure 6:
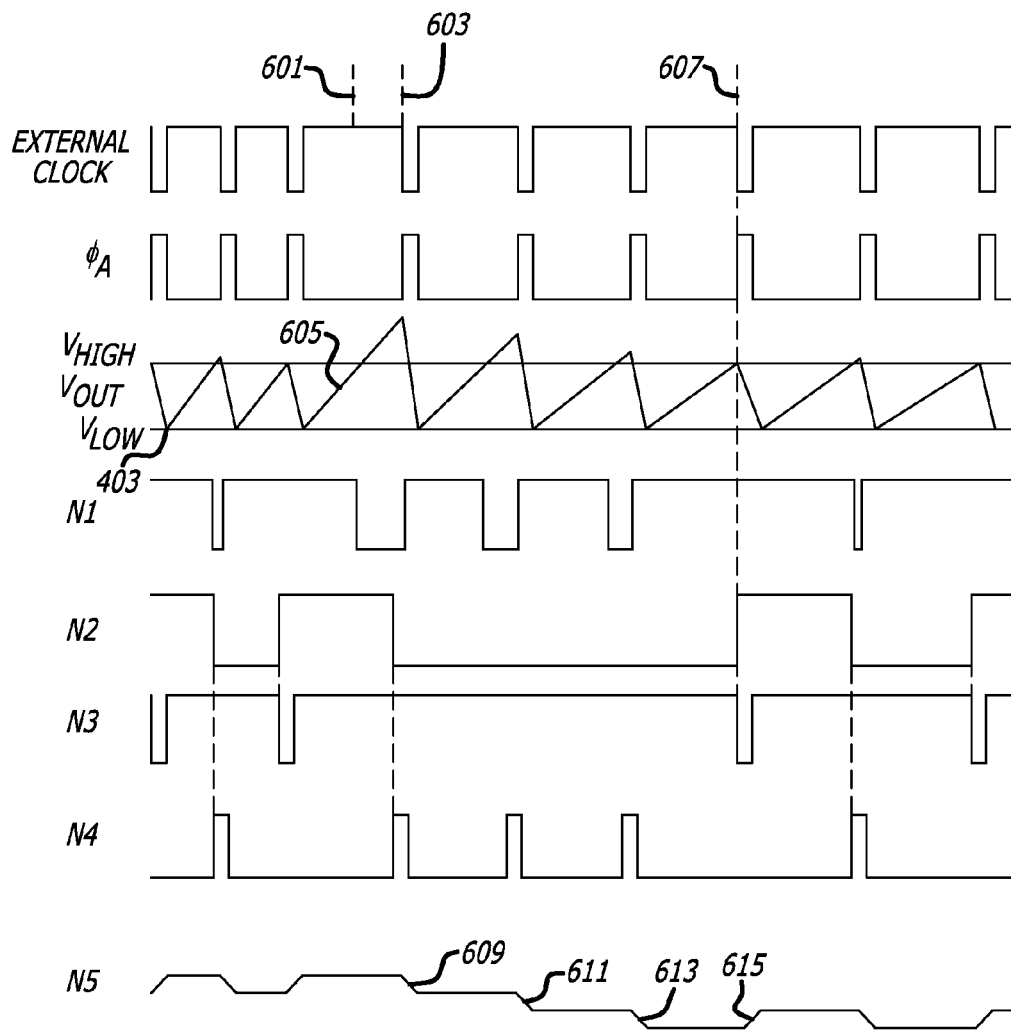
FIG. 6 is a diagram of selected signals in FIG. 4 shown before and after the frequency of an external clock decreases.

FIG. 6 is a diagram of selected signals in FIG. 4 shown before and after the frequency of an external clock decreases. As illustrated in FIG. 6, the on time of the external clock may go beyond a time 601 when, if consistent with an earlier cycle, it would have ended. Instead, the external clock may remain high until a later time 603. This may have the reverse effect as was illustrated in FIG. 5 when the frequency increased. The slope of a ramp 605 of $V_{OUT}$ may have been sufficiently steep as to cause $V_{OUT}$ to have substantially exceeded $V_{HIGH}$ before the time 603 of the falling edge of the external clock. This may cause energy to be repeatedly drained from the capacitor 417 during off periods of the external clock, as evidenced by falling edges 609, 611, and 613. This may continue until the slope of the ramp of $V_{OUT}$ is sufficiently shallow that $V_{OUT}$ does not exceed $V_{HIGH}$ when the external clock falls, such as at a time 607. Thereafter, and for the first time after the decrease in the frequency of the external clock, charge may then be added to the capacitor 417, as evidenced by the gate of the p-channel MOSFET 411 being actuated at the node N3 and a rising edge 615 at the node N5. The circuit in FIG. 4 may then go back to the mode of the capacitor 417 being alternately charged and discharged during each cycle of the external clock, as illustrated in FIG. 6.

Thus, the circuit of FIG. 4 accomplishes several functions: It synchronizes the oscillating ramp signal to the external clock; it quickly adjusts the slope of the oscillating ramp signal so that it always reaches approximately $V_{HIGH}$, notwithstanding changes in the period of the oscillating ramp needed to maintain synchronism with the external clock; and it resets each period of the oscillating ramp signal to a low reference signal $V_{LOW}$.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The term "coupled" encompasses both direct and indirect coupling. For example, the term "coupled" encompasses the presence of intervening circuitry between two points that are coupled.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. An oscillator comprising:
   an energy storage system configured to store energy;
   a ramp circuit that is distinct from the energy storage system configured to generate an oscillating ramp signal having a slope that is a function of the amount of energy stored in the energy storage system;
   a charge circuit configured to controllably deliver energy into or remove energy from the energy storage system;
   a comparator circuit configured to compare the oscillating ramp signal with a reference signal; and
   a charge control circuit configured to cause the charge circuit to deliver energy into or remove energy from the energy storage system based on the comparison by the comparator circuit.

2. The oscillator of claim 1 wherein the energy storage system includes a capacitor.

3. The oscillator of claim 1 wherein the energy storage system and the charge circuit are part of a charge pump circuit.

4. The oscillator of claim 1 wherein the ramp circuit includes a controllable current source connected to a capacitor.

5. The oscillator of claim 4 wherein the ramp circuit includes a voltage-to-current conversion circuit and wherein the controllable current source is part of the voltage-to-current conversion circuit.

6. The oscillator of claim 5 wherein the voltage-to-current conversion circuit is connected to the energy storage system and configured to generate a current that is a function of the amount of energy in the energy storage circuit.

7. The oscillator of claim 1 wherein the ramp signal has a slope that is a substantially-linear function of the amount of energy that is stored in the energy storage system.

8. The oscillator of claim 1 wherein the reference signal represents a desired target amplitude for the oscillating ramp signal.

9. The oscillator of claim 1 wherein the oscillating ramp signal has a periodic reset phase and wherein the charge control circuit is configured to cause the charge circuit to deliver energy into or to remove energy from the energy storage system during the periodic reset phase of the oscillating ramp signal.

10. The oscillator of claim 9 wherein the charge control circuit is configured to cause the charge circuit to deliver energy into or to remove energy from the energy storage system only during the periodic reset phase of the oscillating ramp signal.

11. The oscillator of claim 1 further comprising an external clock synchronization circuit that is configured to substantially synchronize the oscillating ramp signal with an external clock.

12. The oscillator of claim 11 wherein the oscillating ramp signal has a periodic reset phase and wherein the external clock synchronization circuit is configured to initiate each periodic reset phase in substantial synchronism with the external clock.

13. The oscillator of claim 11 wherein the external clock synchronization circuit includes a latch circuit having an input controlled by the external clock.

14. The oscillator of claim 1 wherein the reference signal is a first reference signal and wherein the oscillating ramp signal has a periodic ramp phase and a periodic reset phase, and further comprising a reset amplitude control circuit configured to terminate each periodic reset phase and initiate each periodic ramp phase each time the oscillating ramp signal substantially reaches the level of a second reference signal.

15. The oscillator of claim 14 wherein the second reference signal represents a desired amplitude for the oscillating ramp signal.

16. The oscillator of claim 14 wherein the reset amplitude control circuit includes a comparator configured to compare the oscillating ramp signal to the second reference signal.

17. An oscillator comprising:
   an energy storage system configured to store energy; and
   a ramp circuit configured to generate an oscillating ramp signal having a controllable slope that is a function of the amount of energy stored in the energy storage system.

18. The oscillator of claim 17 further comprising an external clock synchronization circuit that is configured to substantially synchronize the oscillating ramp signal with an external clock.

19. The oscillator of claim 17 wherein the ramp circuit includes a voltage-to-current conversion circuit connected to a capacitor and to the energy storage system.

20. An oscillator comprising:
   a ramp circuit configured to generate an oscillating ramp signal having a slope that is a function of the amount of energy stored in an energy storage system that is distinct from the energy storage system;
   a charge control circuit configured to cause energy to be delivered to or removed from the energy storage system based on a comparison of the oscillating ramp signal and a reference signal.

21. An oscillator comprising:
   means for storing energy;
   means for generating an oscillating ramp signal that is distinct from the means for storing energy having a slope that is a function of the amount of energy stored in the means for storing energy;
   means for controllably delivering energy into or remove energy from the means for storing energy;
   means for comparing the oscillating ramp signal with a reference signal; and
   means for causing the means for controllably delivering energy to deliver energy into or remove energy from the means for storing energy based on the comparison by the means for comparing.

* * * * *